United States Patent [19]
Sharma et al.

[11] Patent Number: 5,829,016
[45] Date of Patent: Oct. 27, 1998

[54] MEMORY SYSTEM WITH MULTIPLEXED INPUT-OUTPUT PORT AND SYSTEMS AND METHODS USING THE SAME

[75] Inventors: Sudhir Sharma, Plano; Ronald T. Taylor, Grapevine; Michael E. Runas, McKinney; G. R. Mohan Rao, Dallas, all of Tex.

[73] Assignee: Cirrus Logic, Inc., Fremont, Calif.

[21] Appl. No.: 638,953

[22] Filed: Apr. 24, 1996

[51] Int. Cl.[6] .................................................. G06F 12/00
[52] U.S. Cl. ............... 711/111; 365/230.02; 365/189.02; 364/DIG. 1
[58] Field of Search ................... 395/182.04; 365/238.5, 365/189.02; 711/111

[56] References Cited

U.S. PATENT DOCUMENTS

| | | | |
|---|---|---|---|
| 5,313,624 | 5/1994 | Harriman et al. | 395/182.04 |
| 5,319,755 | 6/1994 | Farmwald et al. | 395/325 |
| 5,408,129 | 4/1995 | Farmwald et al. | 257/692 |
| 5,430,676 | 7/1995 | Ware et al. | 365/189.02 |
| 5,434,817 | 7/1995 | Ware et al. | 365/189.01 |
| 5,537,353 | 7/1996 | Rao et al. | 365/189.02 |
| 5,539,696 | 7/1996 | Patel | 365/189.01 |
| 5,570,320 | 10/1996 | Runas | 365/230.03 |
| 5,581,513 | 12/1996 | Rao | 365/238.5 |

*Primary Examiner*—Tod R. Swann
*Assistant Examiner*—David Langjahr
*Attorney, Agent, or Firm*—James J. Murphy; Steven A. Shaw

[57] ABSTRACT

A memory including a plurality of input/output terminals 220 for exchanging data bits during a data access cycle and receiving command and control bits during a command and control cycle. The memory further includes an array of memory cells 201, a data input/output circuitry for transferring data between the input/output terminals and the array of memory cells during the data access cycle, and control circuitry for controlling operations of the memory in response to command and control bits received at the input/output terminals during the command and control cycle.

29 Claims, 3 Drawing Sheets

MEMORY SYSTEM WITH MULTIPLEXED INPUT-OUTPUT PORT AND SYSTEMS AND METHODS USING THE SAME

CROSS-REFERENCE TO RELATED APPLICATION

The following co-pending and co-assigned application contains related information and is hereby incorporated by reference:

U.S. patent application Ser. No. 08/521,867 (Attorney's Docket Number 2836-P036US), entitled "Low Pin Count—Wide Memory Devices And System And Methods Using The Same," filed Aug. 31, 1995 and upon which the issue fee has been paid.

FIELD OF THE INVENTION

The present invention relates in general to electronic circuits and devices and in particular to a memory system with a multiplexed input-output port and systems and methods using the same.

BACKGROUND OF THE INVENTION

Most memory subsystems employed in currently available computer systems are either constructed from static random access memory devices (SRAMs) or dynamic random access memory devices (DRAMs). Each type of memory device has advantages and disadvantages, and as a result DRAMs and SRAMs are typically restricted to different applications. SRAMs are faster and are typically used in those applications where fast access times and high bandwidth are critical, such as in cache memories. SRAMs however consume more power, are more expensive to fabricate, and provide fewer cells (bits) per given chip space. On the other hand, while slower than SRAMs, DRAMs are typically less expensive, consume substantially less power, and provide more bits in the same chip space (i.e. have a higher cell density). DRAMs are typically used to construct those memory subsystems, such as system memories and display frame buffers, where power conservation and cell density are more critical than speed. In most computing systems, it is these subsystems which dominate the system architecture, and hence, DRAMs remain the prevalent type of memory device on the market.

In the vast majority of presently available commercial DRAMs, the maximum number of available data input/output pins is 16, allowing access to a maximum of 16 bits per random access or page cycle. This presents a problem in the construction of state of the art computing systems, where the data buses are as wide as 64 or 72 bits. For example, to support a 64-bit wide data bus, four parallel "by 16" devices are required per bank of memory. Multiple chips in turn require additional board space, increase power consumption and increase the number of required interconnections on the printed circuit boards. Further, since monolithic DRAMs are constructed in fixed sizes, such as 512K Bytes or 2 Mbytes, memory space is often wasted. In other words, depending on whether 512 Kbyte or 2 MByte devices are used, each system memory bank may have a corresponding capacity of 1 MByte or 4 MBytes respectively, assuming four by 16 devices are used to serve a 64-bit bus. If only an intermediate capacity is required per bank, such as 3 MBytes, the larger incrementation must be selected and substantial memory space is wasted.

It would be advantageous to construct DRAMs with wider data ports more suitable for supporting wide state of the art data buses. For example, two DRAMs each with 32 data pins or only one DRAM with 64 data pins could support a 64-bit bus during a single random or page access. However, increased pin count almost always increases device cost. In devices such as the CPU, where only a single unit is required per system, the increased cost associated with increased pin count can usually be tolerated. In contrast, such cost increases normally cannot be tolerated in the case of memory devices, since a significant number of memory devices are normally required per system, typically between 10 and 20 in current architectures. The problem of pin count is particularly difficult to address if a 64-bit wide device is considered. Here, at least 64 data pins and approximately 21 other pins (for addresses, power and control signals) would be required. Currently available packages come in 60 and 100 pin counts, and therefore, in this case, the more expensive 100 pin package would have to be selected, even though a large number of pins would go unused.

Another disadvantage found in conventional DRAMs is the complex timing scheme required to input row and column addresses through the multiplexed address ports normally employed. A multiplexed address port, and consequently a multiplexed address bus at the system level, allows a reduction in the number of pins required for addressing. Typically, the row address bits are presented to the address pins and latched into the DRAM device with a row address strobe ($\overline{RAS}$ signal provided by the system core logic. The column address bits are then presented at the same address pins and latched in with a column address strobe ($\overline{CAS}$) signal. During page mode, additional column addresses are input with additional active cycles of $\overline{CAS}$. While the multiplexed address port system save pins, its makes addressing at both the device and system level substantially more complicated. Further, when multiple chips are used, multiple $\overline{RAS}$ and/or $\overline{CAS}$ signals are often required for bank (chip) select, further complicating the timing scheme. Among other things, this also increases device and system costs.

Thus, the need has arisen for circuits and methods for implementing wide memory devices. In particular, such circuits and methods should be applicable to DRAM memory devices, although not necessarily limited thereto. In implementing such devices, the pin count should be minimized and the address timing substantially simplified.

SUMMARY OF THE INVENTION

According to a first embodiment of the principles of the present invention, a memory is provided which includes a plurality of input/output terminals for exchanging data bits during a data access cycle and receiving command and control bits during a command and control cycle. The memory also includes an array of memory cells and data input/output circuitry for transferring data between the input/output terminals and the array of memory cells during the data access cycle. Additionally, the memory includes control circuitry for controlling operations of the memory in response to command and control bits received at the input/output terminals during the command and control cycle.

According to a second embodiment of the principles of the present invention, a memory device is provided which is fabricated on a single chip. The memory device includes a plurality of input/output pins, an array of random access memory cells and control circuitry for decoding command opcode bits received by first selected ones of said input/output pins during a command cycle. The memory further includes at least one pointer register for storing under the control of the control circuitry a pointer received by second selected ones of the input/output pins during the command cycle. The memory device additionally includes read/write circuitry for reading and writing data through the plurality of input/output pins during a data access cycle into and out of selected locations within the array identified by the pointer bits stored in the at least one pointer register.

According to a third embodiment of the principles of the present invention, a memory system is provided which includes an array of memory cells and a plurality of multiplexed input/output terminals. A command latch is included for storing command opcodes received at first selected ones of the terminals during command cycles. Control logic is provided for decoding opcodes stored in the command latch. Pointer latches are included for storing pointer bits received at second selected ones of the terminals during selected command cycles in response to ones of the opcodes decoded by the control logic. Addressing circuitry is provided for accessing a selected location of a selected page in the array in response to pointer bits stored in the pointer latches. An input data path allows input of data received at the input/output terminals during selected data access cycles and an output data path provides for the outputting of data during selected data cycles. Finally, the memory system includes a data switch for selectively coupling a selected one of the input and output data paths to the addressing circuitry in response to selected opcodes stored in the command latches.

The principles of the present invention are further embodied in methods for operating memories. According to one such embodiment, a method is provided for operating a memory subsystem including a plurality of input/output terminals, an array of memory cells, and data input/output circuitry for exchanging data between the array and the input/output terminals. The method includes the step of during a command and control cycle, inputting through the input/output pins a command opcode, the opcode selecting a data access operation to be made to the array, along with pointer bits selecting a location in the array to be accessed. During a data access cycle, the selected data access operation is performed via the data input/output circuitry and the input/output pins.

The principles of the present invention advantageously provide for the design and construction of wide memory devices. Among other things, such wide memory devices may be used to reduce the number of memory devices (chips) required to service the wider data buses typically now found in state of the art processing systems. At the same time, devices embodying the principles of the present invention efficiently use the available pinouts, thereby reduce the amount of wasted memory capacity while still allowing for the use of standardized packages. Finally, in those embodiments which do not require externally generated RAS and CAS signals, the address timing is substantially simplified.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–5 of the drawings, in which like numbers designate like parts. While memory devices embodying the principles of the present invention are useful in a wide number of applications, for purposes of illustration, such memory devices will be described in conjunction with a basic processing system architecture typically employed in personal computers.

Figure 1:
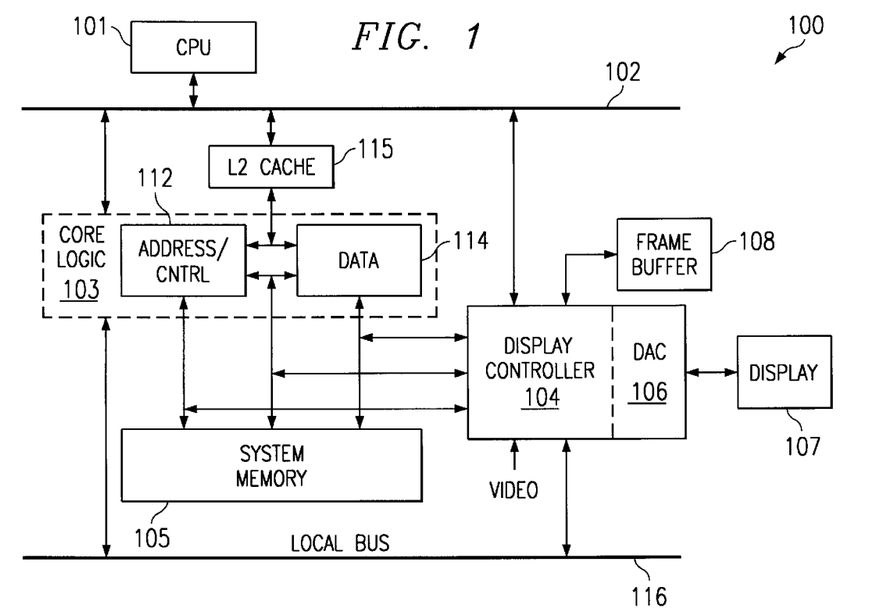
FIG. 1 is a high level system block diagram of an exemplary data processing system architecture in which memory devices and methods embodying the principles of the present invention may suitably be employed.

FIG. 1 is a high level functional block diagram of portion of a processing system 100. System 100 includes a central processing unit 101, a CPU local bus 102, core logic 103, a display controller 104, a system memory 105, a digital to analog converter (DAC) 106, frame buffer 108, a display device 107 and peripheral bus 116.

CPU 101 is the "master" which controls the overall operation of system 100. Among other things, CPU 101 performs various data processing functions and determines the content of the graphics data to be displayed on display unit 107 in response to user commands and/or the execution of application software. CPU 101 may be for example a general purpose microprocessor, such as an Intel Pentium class microprocessor or the like, used in commercial personal computers. CPU 101 communicates with the remainder of system 100 via CPU local bus 102, which may be for example a special bus, or a general bus. As discussed further below, bus 102 may be used to implement the novel memory interface of the present invention.

Core logic 103, under the direction of CPU 101, controls the exchange of data, addresses, control signals and instructions between CPU 101, display controller 104, and system memory 105. Core logic 103 may be any one of a number of commercially available core logic chip sets designed for compatibility with the remainder of the system, and in particular with CPU 101. According to the principles of the present invention, core logic 103 is modified in hardware or programmed by software or firmware to interface with a system memory 105 constructed from memory devices 200 described below. One or more core logic chips, such as chip 112 in the illustrated system, are typically "address and system controller intensive" while one or more core logic chips, such as chip 114 in FIG. 1, are "data intensive." Address intensive core logic chip 112 generally: interfaces CPU 101 with the address path of CPU bus 102; maintains cache memory, including the cache tags, set associative cache tags and other data necessary to insure cache coherency; performs cache "bus snooping"; generates the control signals required for DRAMs in the system memory or cache; and controls general management transactions. Data intensive chip 114 generally: interfaces CPU 101 with the data path of CPU bus 102; issues cycle completion responses to address chip 112 or CPU 101; may abort operations if their cycles are incomplete; and arbitrates for the data path of bus 102.

CPU 101 can directly communicate with core logic 103 or through an external (L2) cache 115. L2 cache 115 may be for example a 256K Byte fast SRAM device(s). It should be noted that CPU 101 can also include on-board (L1) cache, typically up to 16 kilobytes.

Display controller 104 may be any one of a number of commercially available VGA display controllers modified as required to interface with memory 200, when the principles of the present invention are applied to the display controller/ frame buffer interface. For example, display controller 104 may be one of the Cirrus Logic CL-GD754x series of display controllers. The structure and operation of such controllers is described in *CL-GD754x Application Book*, Rev 1.0, Nov. 22, 1994, and *CL-GD7542 LCD VGA Controller Preliminary Data Book*, Rev. 1.0.2, June 1994, both available from Cirrus Logic, Inc., Fremont, Calif., and incorporated herein by reference. Display controller 104 may receive data, instructions and/or addresses from CPU 101 through core logic 103. Data, instructions, and addresses are exchanged between display controller 104 and system memory 105 through core logic 103. Further, addresses and instructions may be exchanged between core logic 103 and display controller 104 via a peripheral (local) bus 116 which may be for example a PCI local bus. Additionally, peripheral bus 116 may be designed and constructed to effectuate the novel interface described below in conjunction with the memory of FIG. 2.

Generally, display controller 104 controls screen refresh, executes a limited number of graphics functions such as line draws, polygon fills, color space conversion, display data interpolation and zooming, and video streaming, and handles other ministerial chores such as power management. Most importantly, display controller 104 controls the raster of pixel data from frame buffer 108 to display unit 107 during screen refresh and interfaces CPU 101 and frame buffer 108 during display data update. Video data may be directly input into display controller 104.

Digital to analog converter 106 receives digital data from controller 104 and outputs the analog data to drive displays 107a and 107b (when used) in response. In the illustrated embodiment, DAC 106 is integrated with display controller 104 onto a single chip. Depending on the specific implementation of system 100, the display controller 104 may also include a color palette, YUV to RGB format conversion circuitry, and/or X- and Y- zooming circuitry, to name a few options. Displays 107 may be for example a CRT unit, a liquid crystal display, electroluminescent display, plasma display, or other type of display device which displays images on a screen as a plurality of pixels. It should also be noted that in alternate embodiments, "display" 107 may be another type of output device such as a laser printer or similar document view/print appliance.

Figure 2:
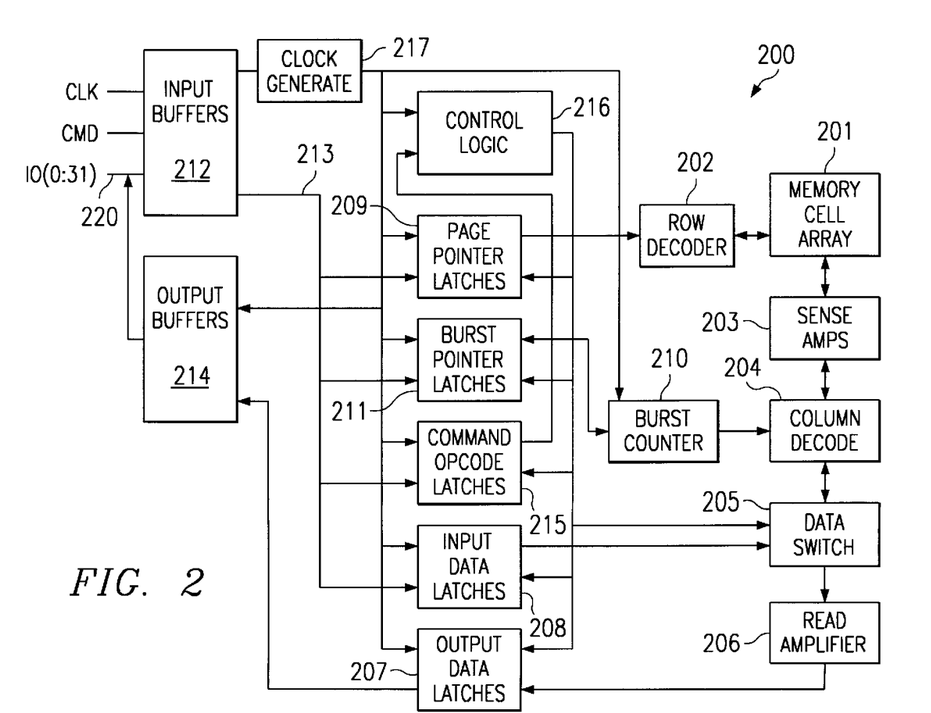
FIG. 2 is a more detailed functional block diagram of an exemplary memory subsystem embodying the principles of the present invention.

FIG. 2 is a high level functional block diagram of a memory system 200 embodying the principles of the present invention. In the preferred embodiment, the memory system 200 is fabricated on a single integrated circuit chip. In alternate embodiments, a memory system 200 may be fabricated on multiple chips.

Memory system 200 includes an array 201 of memory cells arranged in M number of rows and N numbers of columns. In the preferred embodiment, cell array 201 comprises an array of dynamic random access memory (DRAM) cells with each row of cells associated with a conductive wordline and each column of cells associated with at least one conductive bitline. In alternate embodiments, cell array 201 may be an array of static random access memory (SRAM) cells or ferroelectric random access memory cells (FRAM), read-only memory (ROM) cells, electrically programmable read-only memory cells (EPROM) or electrically-erasable, electrically-programmable read-only memory (EEPROM) cells.

One out of M rows (pages) is selected by access through a row decoder 202 coupled to the wordlines of array 201 in response to received page pointer bits. The bitlines of array 201 are coupled to a plurality of sense amplifiers 203 and a column decoder 204. Among other things, sense amplifiers 203 differentially sense and latch the data appearing on the bitlines associated with the cells along the row selected by row decoder 202 during a read. During an access (i.e., read or write), column decoder 204 selects, in response to received burst pointer bits, w number of bitlines to access w number of cells (i.e., a w-bit wide storage location) along the row selected by row decoder 202.

In the preferred embodiment, row decoder 202, sense amplifiers 203, and column decoder 204 are constructed from dynamic circuitry, although in alternate embodiments, static circuitry also may be used. For description of the fundamental principles upon which the construction and operation of cell array 201, row decoder 202, sense amplifier 203, and column decoder 204 are based, please refer to the following selected articles: "*A 64-k Dynamic RAM Needs Only One 5-volt Supply to Outstrip 16k Parts*", G. R. Mohan Rao and John Hewkin, Electronics, Sep. 28, 1978, pp. 109–116; "*A 1 Mb DRAM With Design-For-Test Functions,*" J. Neal, B. Holland, S. Inoue, W. K. Loh, H. McAdams and K. Poteet, International Solid State Circuit Conference 1986, Digest of Technical Papers, pp. 264–265; "*A 4 Mb DRAM With Half Internal-Voltage Bitline Precharge*", International Solid State Circuit Conference 1986, Digest of Technical Papers, pp. 270–271; "*A Full Bit Prefetch Architecture For Synchronous DRAMs*", T. Sunaga, K. Hosokawa, Y. Nakamura, M. Ichinose, A Moriwaki, S. Kakimi and N. Kato, IEEE Journal of Solid State Circuits, Vol 30., No. 9, September 1995, pp. 994–1005; and "*DRAM Macros For ASIC Chips*", IEEE Journal of Solid State Circuits, Vol 30., No. 9, September 1995, pp. 1006–1014, each incorporated herein by reference.

According to the principles of the present invention, memory device 200 includes a plurality of multiplexed input/output pins 220. In the illustrated embodiment, input/ output port (pins) 220, labelled IO(0:31), input or output data during a data access mode (cycle) and receive command, control and address bits during a command and control mode (cycle). While 32 input/output pins (terminals) are shown in the illustrated embodiments, it should be noted that the principles of the present invention can be advantageously applied to devices of different pinouts, such as a 64- or 72-pin pinout. In the preferred embodiment, a command bit (CMD) which is received through a selected input (pin) controls and times the address/control and data access modes.

In the data access mode, data is exchanged with column decoder 204 through a data switch 205. Data switch 205 may be for example, an array of gates, or latches, or sense amplifiers. During a read operation, data switch 205 couples column decoder 204 with read amplifiers 206 and output data latches 207. During a write operation, data switches 205 couples column decoder 204 with input data latches 208. During a write masking operation, data switches 205, configured in response to mask data input latches 218, mask a selected number of bits which will not be modified during a given subsequent write operation. Each of these operations will be discussed in further detail below.

Data being read from array 201 is pipelined through read amplifiers 206 and output latches 207 to output buffer 214.

When enabled, output buffers 214 directly drive the input/output port (pins) IO(0:31). Data being written into array 201 is input through input buffers 212 to an internal bus 213 and latched into input data latches 208. Input data latches 208 in turn present data directly to data switches 205. During a write operation, output buffers 214 are in a tri-state (high impedance) state.

During the command and control mode, command and control bits are presented to input/output inputs IO(0:31) and input through input buffers 212 to internal bus 213. Command opcode bits are received and latched into command opcode latches 215. Depending on the operation identified by the command opcode bits, page pointer (row address) bits are selectively latched from bus 213 into page pointer latches 209 and burst pointer bits are selectively latched into burst pointer latches 211 from bus 213. During a read or write, the burst pointer bits are loaded from burst pointer latch into a burst counter 210. Burst counter 210 counts (increments or decrements) from the initial burst pointer received from latch 211 to generate a series of column addresses. These column addresses allow access to a predetermined number of w-bit wide locations through column decoder along the page (row) pointed to by the bits in latches 209. In the preferred embodiment, burst counter counts from the burst pointer until the end of page has been reached or until a page close command or refresh command is received. In alternate embodiments, a final or stopping burst pointer may be latched into burst pointer latches 211 identifying a last location to be accessed in the open page.

The command opcode bits latched into command latch 215 are decoded by control logic and clock generation circuitry 216. Clock and control signals generated in response by control logic/clock generation circuitry 216 are distributed by an internal control bus 217. Control bit stored in command opcode latches 215 are presented to control logic/clock generation circuitry 216 via control bus 217. TABLE I summarizes a preferred set of opcodes and corresponding control bits, such as the pointers, and corresponding input pin assignments (numerical values are given in hexadecimal form):

| Command | COMMAND TRUTH TABLE | | | |
| --- | --- | --- | --- | --- |
| | IO31–IO27 | IO26–IO21 | IO20–IO10 | IO09–IO00 |
| SRON | 01h | Don't Care | Don't Care | Don't Care |
| SROF | 02h | Don't Care | Don't Care | Don't Care |
| NOP | 00h | Don't Care | Don't Care | Don't Care |
| SAC (set burst latency = 1) | 03h | 00h | Don't Care | Don't Care |
| SAC (set burst latency = 2) | 03h | 01h | Don't Care | Don't Care |
| SAC (set burst latency = 3) | 03h | 02h | Don't Care | Don't Care |
| SAC (set page latency = 1) | 03h | 03h | Don't Care | Don't Care |
| SAC (set page latency = 2) | 03h | 04h | Don't Care | Don't Care |
| SAC (set page latency = 3) | 03h | 05h | Don't Care | Don't Care |
| SAM* (set mask) | 04h | 00h | Don't Care | Don't Care |
| SAM (enable mask) | 04h | 01h | Don't Care | Don't Care |
| SAM (disable mask) | 04h | 02h | Don't Care | Don't Care |
| OP | 07h | Chip Pointer | Page Pointer | Don't Care |
| CP | 08h | Chip Pointer | Page Pointer | Don't Care |
| FR | 09h | Chip Pointer | Don't Care | Don't Care |
| PR | 0Ah | Chip Pointer | Page Pointer | Burst Pointer |
| PW | 0Bh | Chip Pointer | Page Pointer | Burst Pointer |
| CBP | 0Ch | Chip Pointer | Page Pointer | Burst Pointer |

*Next clock cycle has 32 bit mask.

The self-refresh on command SRON sets memory 200 into a refresh mode during which a refresh counter and oscillator within control logic 216 increment the page pointer within page pointer latches 209. The resulting sequence of page pointers are used by row decoder 202 to step through the wordlines of cell array 201. As each wordline is activated, sense amplifiers 203 refresh the data appearing on the array bitlines in a conventional manner. Preferably, during a self-refresh operation, the only command which will be accepted by memory 200 is the self-refresh exit command, SROF which terminates refresh operations and prepares the device to accept new commands.

The no operation command NOP indicates that no command/control operation is being performed during the given command/control operation.

The set attribute clock commands SAC allow the initial page latency and burst latency to be set for memory 200. The burst latency in the preferred embodiment is the frequency, in number of master clock periods CLK, between location (column) accesses from an open page. In the illustrated embodiment, burst latencies of 1, 2, or 3 may be selected. A burst latency of 1 results in an access with each clock during the subsequent data access cycle, with a burst latency of 2, data is input/output with every other clock and with a burst latency of 3, with every third clock. The page latency is the number of clocks CLK after the opening of the selected page (row) the first location access can be made. In the illustrated embodiment, page latencies of 1, 2, or 3 may be selected. The page and burst latency select options allow the timing of accesses to memory 200 to be adjusted, with respect to the master clock, to meet the data input/output timing requirements of the associated processing circuitry.

The set mask command SAM allows for input of a write mask on the next data input/output cycle. In the illustrated embodiment, where accesses to array 201 are made in 32-bit words, the data mask is preferably 32-bits thereby allowing masking with a 1-bit resolution. Once set, the mask can be selectively enabled or disabled in subsequent command/control cycles using the enable mask and disable mask commands shown in TABLE I.

The open page command OP activates the page pointer held in page pointer latch 209 thereby allowing row decoder 202 to activate (select) the corresponding wordline in array 210. Once the page is open, memory 200 waits for a read or write command opcode to continue operation. Preferably no more than one page can be opened simultaneously with the same most significant page pointer bit.

The close page CP command returns the open page to precharge. If multiple pages have been opened, all are returned to precharge simultaneously.

The function read command FR causes memory 200 to return a 32-bit ID number assigned to the device during the next data input/output cycle. The ID number may be hardwired into memory 200 or stored in a register, such as with command opcode latches 215, by software. During data accesses, this ID is compared with a received chip pointer allowing selective enablement of individual memory devices 200 in multiple device memory systems.

The page read command PR can be used in at least two ways. First, when used in conjunction with the page and burst pointers, the page read command initiates a burst read starting at the location pointed to by the burst pointer along the page pointed to by the page pointer. Second, when used with a burst pointer alone for a page which has already been opened, this command will execute a burst read starting at the specified initial burst location loaded into burst pointer latches 211.

The page write command WR operates for a write operation similar to the manner in which the PR command operates for a read operation. In this case however, output buffer 214 is set into a tri-state condition and the device accepts input data to be written into locations in array specified by the burst pointer. The PR and PW can be combined provided a one clock cycle latency is allowed to switch the burst over.

The change burst pointer command CBP changes the burst pointer for either a read or a write for a selected open page. If preceded by a page read PR command, the read will continue at the new burst pointer location with the next data input/output cycle after the CBP command has been asserted. If preceded by a page write PW command, the write will continue during the next data access cycle after the CBP command has been asserted, resuming at the new burst pointer location.

The incoming master clock which times the overall operation of memory 200 is received through input buffers 212 and passed to clock generators 217. All inputs and outputs are referenced to the edges of the master clock CLK. Clock generators 217 generate clocks necessary to time the latching of data and commands, the counting of burst counter 210 and for controlling the operation of the dynamic circuitry used in row decoder 202, sense amplifier 203, and column decoder 204.

Figure 3A:
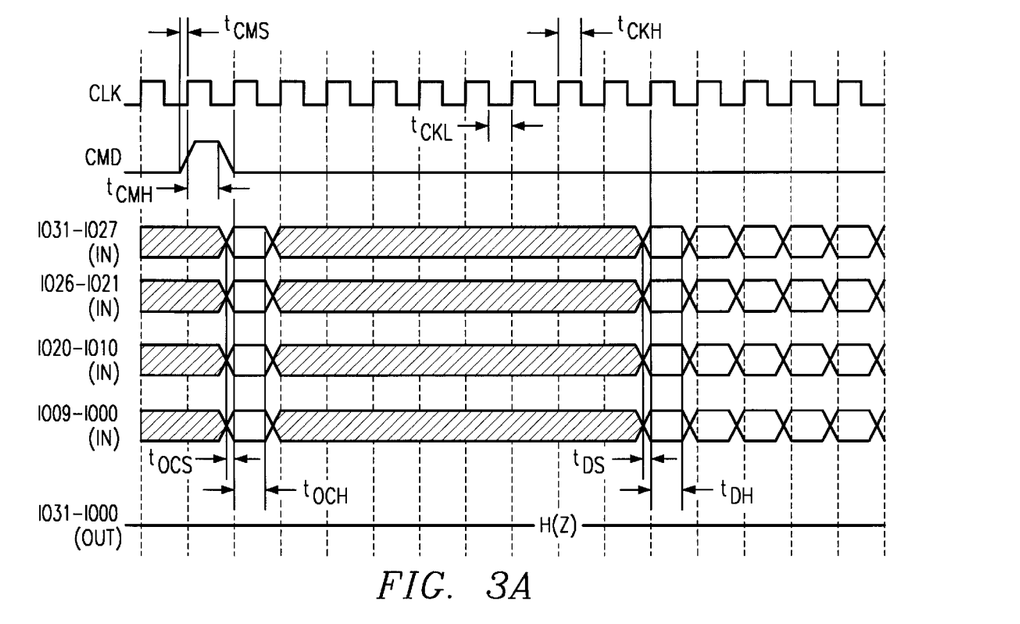
FIGS. 3A and 3B are timing diagrams depicting exemplary page write and page read operations according to the principles of the present invention.
Figure 3B:
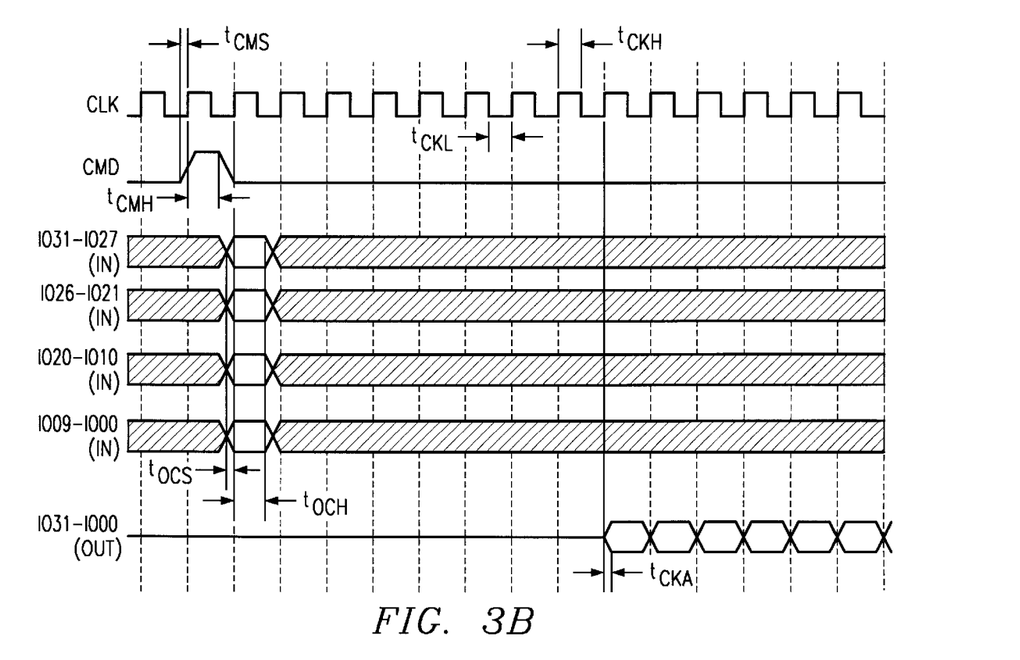

The operation of memory 200 can be best described in conjunction with FIG. 3A and 3B, which are timing diagrams of representative page read and page write operations. It should be noted that the other operations defined in TABLE I follow a similar timing scheme. In some operations, such as setting the burst and page latencies or setting the mask, the command and control cycle may not be immediately followed by a data access cycle. In such cases, memory 200 idles or resumes its previous data stream as appropriate until another command opcode is received and decoded, either during a new command/control cycle initiated by CMD or during the same command/control cycle.

Figure 4:
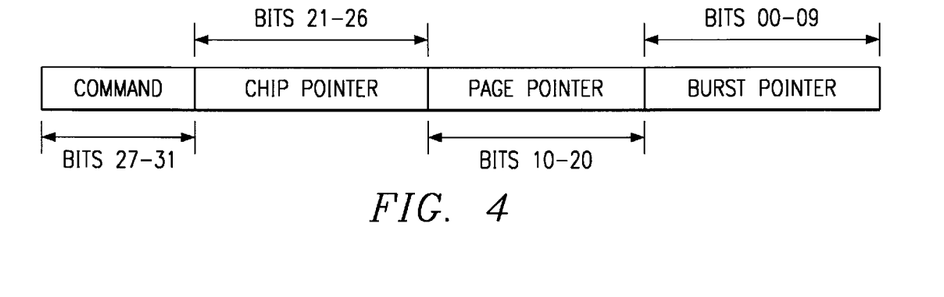
FIG. 4 is an exemplary command and control word received during a command and control cycles.

At the start of the command/control cycle, core logic 103 or processor 101 sets the command bit CMD high. With the command bit high, output buffer 214 is tristated and the bits input to bus 213 on the next rising edge of CLK are interpreted as being commands and/or pointers. In both the case of a write (FIG. 3A) and a read (FIG. 3B), the bits received at inputs IO(0:9) constitute the burst pointer, the bits received at inputs IO(10:20) constitute the page (row) pointer, the bits received at inputs IO(21:26) constitute the chip pointer, and the bits received at inputs IO(27:31) constitute the command bits (per TABLE I, for a read the preferred command opcode bits are 0Ah, and for a write, 0Bh). FIG. 4 depicts a typical input word organization for a read or write. These bits are input into the corresponding latches (registers) with clocks generated from the master clock.

The page pointer bits select one row in array 201 and the burst pointer bits select at least one initial w-bit wide location along that row for access. It should be noted that the number of page pointer bits and the number of burst pointer bits required may vary from embodiment to embodiment depending on such factors as the number of rows in array 201 and the number and width (number of physical columns) of each column, among other things. For example, assume that array 201 is arranged as 1,024 rows and 1,024 32-bit columns. In this case, all ten page pointer bits are acquired to select one out of 1,024 rows and all ten column address bits are required to select one 32-bit wide column (i.e. one 32-bit location).

In the preferred embodiment, with the falling edge of the command bit, the data access mode begins for a read or write command (for some other operations shown in Table I memory 200 waits for another command, such as one to start an access). After a delay of a pre-determined number of master clock cycles, to allow for sense amplifiers 203 to set-up, 32-bit words of data can be read or written to/from locations of the selected page (row) as burst counter increments (or decrements) from the received burst counter value. Prior to the start of the depicted operations, one command/control cycle is assumed to have taken place during which the burst latency has been set to 1, for example, per the preferred embodiment of TABLE I, the command bit CMD is set high, an set burst latency command of 03h is presented to inputs IO(27-27) and a 01h presented to chip pointer inputs IO(21-26).

Data switches 205 not only controls the coupling of data between column decoder 204 and the read and write data paths, but also allows for write masking. During a selected command cycle, a set mask command is input, preferably as set forth in TABLE I, and latched into command/chip pointer latch 215. After the command bit CMD goes low, a 32-bit mask is then input through inputs IO(0:31) and latched into mask data latches 218. Control logic 216 configures data switches 205 to mask data received through input latch 208 during subsequent write operations, when masking is enabled by a mask enable command cycle in accordance with TABLE I. With a 32-bit data path, a 32-bit mask will allow masking with a single bit resolution. Masking is disabled using the command using the disable mask command also set out in TABLE I.

It should be noted that the present invention is not limited to instances where a single word of command opcodes and control bits are received during a given command/control cycle. For example, on the first clock edge after CMD transitions low, a first 32-bit word of command opcodes and/or control bits are input and latched and on a subsequent clock, a second 32-bit word of command opcodes and/or control bits are input and latched without the need to re-assert CMD. In this fashion, longer opcodes and/or pointers can be input thereby allowing the performance of additional or more complex operations, access to larger memory arrays, or access to smaller locations, among other things.

Figure 5:
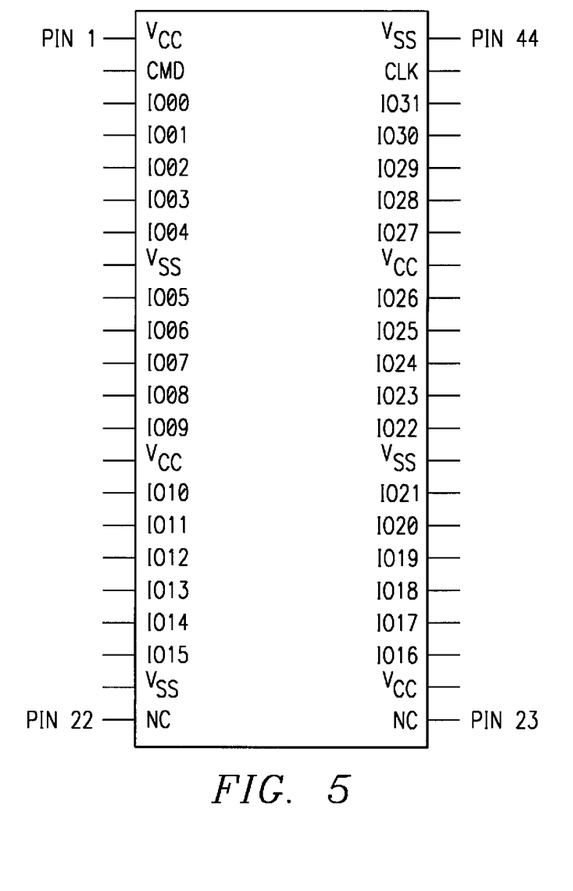
FIG. 5 is one possible pin-out configuration for a memory embodying the principles of the present invention packaged in a standard package.

FIG. 5 is a top plan view diagram depicting a possible pin out configuration for a preferred DRAM embodiment of memory 200. For discussion purposes, a conventional 44-pin, 400 mil, TSOP package is being assumed and that the data word width is 32-bits. It should be noted that in alternate embodiments, the specific pin assignments can change from application to application, depending on such factors as the line assignment in the associated bus and the pin outs of core logic 103 (in a system such as those described above in conjunction with FIGS. 1). It should also be noted that the principles of the present invention are not limited to use in 44-pin TSOP packages, but also may apply to other packages, depending on such factors as width of data word per access and the number of address pins required.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. A memory comprising:
    a plurality of input/output terminals multiplexed by cycle for exchanging data bits during a data access cycle and receiving addresses command opcodes and control bits during a command and control cycle;
    an array of memory cells;
    data input/output circuitry for transferring data between said input/output terminals and said array of memory cells during said data access cycle; and
    control circuitry for controlling operations of said memory in response to command opcodes and control bits received at said input/output terminals during said command and control cycle.

2. The memory of claim 1 and further including a terminal for receiving a command bit, a transition to a selected logic state of said command bit initiating said command and control cycle.

3. The memory of claim 1 wherein said control circuitry comprises:
    a latch for storing selected ones of said command opcodes and control bits received at said input/output terminals; and
    control logic for decoding said bits stored in said latch.

4. The memory of claim 1 wherein said control circuitry comprises:
    page access circuitry for opening a page of said array of memory cells; and
    location access circuitry for accessing a location of an open one of said pages.

5. The memory of claim 4 wherein said page access circuitry includes a page pointer register for storing page pointer bits received from selected ones of said input/output terminals, said page pointer bits identifying a said page to be opened.

6. The memory of claim 4 wherein said location access circuitry includes a pointer latch for storing pointer bits received from selected ones of said input/output terminals, said pointer bits identifying a said location to be accessed.

7. The memory of claim 6 wherein said location access circuitry includes a counter for counting from said pointer bits stored in said pointer latch for accessing a plurality of said locations of a said opened page.

8. The memory of claim 1 wherein said array comprises an array of dynamic random access memory cells.

9. The memory of claim 1 wherein said array comprises an array of read-only memory cells.

10. A memory device fabricated on a single chip comprising:
    a plurality of input/output pins multiplexed by cycle;
    an array of random access memory cells;
    control circuitry for decoding command opcode bits received by first selected ones of said input/output pins during a command cycle;
    at least one pointer register for selectively storing under control of said control circuitry a pointer received by second selected ones of said input/output pins during said command cycle; and
    read/write circuitry for reading and writing data received by said plurality of input/output pins during a data access cycle into and out of selected locations within said array identified by pointer bits stored in said at least one pointer register.

11. The memory device of claim 10 wherein said read/circuitry comprises:
    an input data path including a plurality of input buffers coupled to said plurality of pins and an input latch coupled to said input buffers;
    an output data path including a read amplifier, an output data latch and an output buffer coupled to said plurality of input/output pins; and
    a data switch for selectively switching said input and output data paths to said memory array under control of said control circuitry.

12. The memory device of claim 10 wherein said control circuitry comprises:
    a command opcode latch for storing a said opcode received by said first selected input/output pins during said command cycle;
    control logic for decoding said command opcode stored in said command opcode latch and generating control signals in response.

13. The memory device of claim 12 wherein said at least one pointer register comprises:
    a page pointer latch for storing a page pointer received at a first subset of said second selected ones of said input/output pins in response to a selected said opcode decoded by said control logic; and
    a burst pointer latch for storing a burst pointer received at a second subset of said second selected ones of said input/output pins in response to a selected said opcode decoded by said control logic.

14. The memory of claim 13 wherein said control circuitry further comprises addressing circuitry including:
    a decoder for opening a selected page in said array in response to a page pointer stored in said page pointer latch; and
    a decoder for accessing a selected location along an opened said page in response to a burst pointer stored in said burst pointer latch.

15. The memory of claim 14 wherein said control circuitry further comprises a burst counter for counting from a said burst pointer stored in said burst latch to generate a sequence of burst pointers for accessing a plurality of locations of a said opened page.

16. The memory of claim 15 wherein said array is organized as rows and columns of memory cells and said decoder for opening a selected page comprises a row decoder and said decoder for opening a selected location comprises a column decoder.

17. The memory of claim 11 wherein said data switch is further operable to mask selected bits of a plurality of bits being written to a selected location within said array in response to a plurality of mask bits received at said input/output pins.

18. The memory of claim 11 wherein said mask bits are received at said plurality of input/output pins during a said data access cycle in response to a mask set opcode received during a preceding command cycle.

19. A memory system comprising:

an array of memory cells;

a plurality of multiplexed input/output terminals;

a command latch for storing command opcodes received at first selected ones of said terminals during command cycles;

control logic for decoding opcodes stored in said command latch;

pointer latches for storing pointer bits received at second selected ones of said terminals during selected said command cycles in response to ones of said opcodes decoded by said control logic;

addressing circuitry for accessing a selected location of a selected page in said array in response to pointer bits stored in said pointer latches;

an input data path for inputting data received at said input/output terminals during selected data access cycles;

an output data path outputting data during selected data cycles; and a data switch for selectively coupling a selected one of said input and output data paths to said addressing circuitry in response to selected opcodes stored in said command latches.

20. The memory system of claim 19 wherein said array comprises a plurality of rows of cells and a said page comprises substantially an entire said row.

21. The memory system of claim 19 wherein said addressing circuitry comprises counter circuitry for generating a plurality of addresses in response to a single pointer latched in said pointer latches.

22. The memory system of claim 19 wherein said control logic and said addressing circuitry are further operable to refresh at least one page in said array in response to a refresh opcode received during said command cycle.

23. The memory system of claim 19 wherein said control logic and said data switch are further operable to mask selected bits during a write to an addressed location in said array in response to received masking bits.

24. The memory system of claim 23 wherein said control logic is operable to selectively enable said masking in response to mask enable bits received at selected ones of said input/output terminals during a said command cycle.

25. The memory system of claim 19 wherein bits are exchanged through said input/output terminals timed by a master clock.

26. A method of operating a memory subsystem including a plurality of input/output terminals multiplexed by cycle, an array of memory cells, data input/output circuitry for exchanging data between the array and the input/output terminals, the method comprising the steps of:

during a command and control cycle, inputting through the input/output pins a command opcode selecting a data access operation to be made to the array and pointer bits selecting a location in the array to be accessed; and during a data access cycle, performing the selected data access operation via the data input/output circuitry and the input/output pins.

27. The method of claim 26 and further comprising the step of initiating the command and control cycle with a command signal received on a dedicated pin.

28. The method of claim 26 wherein the command opcode selects between write and read operations.

29. The method of claim 26 wherein said pointer bits include a page pointer selecting a page to be opened and a pointer identifying a location in the opened page to be accessed.

* * * * *